United States Patent [19]
van der Lely et al.

[11] 3,992,863
[45] Nov. 23, 1976

[54] HAY-MAKING MACHINES

[76] Inventors: Ary van der Lely, 10, Weverskade, Maasland; Cornelis Johannes Gerardus Bom, 36, Esdoornlaan, Rozenburg, both of Netherlands

[22] Filed: Jan. 13, 1975

[21] Appl. No.: 540,445

[30] Foreign Application Priority Data
Jan. 18, 1974 Netherlands.................... 7400684

[52] U.S. Cl. ................................................ 56/370
[51] Int. Cl.² ...................................... A01D 79/00
[58] Field of Search .............. 56/370, 365, 366, 367

[56] References Cited
UNITED STATES PATENTS

| | | |
|---|---|---|
| 3,611,690 | 10/1971 | Zweegers.............................. 56/366 |
| 3,664,106 | 5/1972 | Maugg.................................. 56/370 |
| 3,827,224 | 8/1974 | Mulder et al......................... 56/370 |
| 3,841,073 | 10/1974 | van der Lely........................ 56/370 |

Primary Examiner—Russell R. Kinsey
Attorney, Agent, or Firm—Mason, Mason & Albright

[57] ABSTRACT

A haymaking machine is provided with at least one rotary rake member having tines that are pivotable relative to a hub of that rake member about separate first and second axes to improve the tines ability to follow ground undulations during operation of the machine. The tines are adjustable in setting to suit different modes of operation of the machine, are pivotally supported by co-operating screw-threaded surfaces affording said first pivotal axes and are provided with adjustably positionable masses to vary the locations of the centers or points of gravity thereof.

28 Claims, 6 Drawing Figures

FIG. 2

HAY-MAKING MACHINES

This invention relates to haymaking machines of the kind comprising a frame and at least one rake member carried by the frame so as to be rotatable about a corresponding upright axis, said rake member being provided with a plurality of tine groups.

According to one aspect of the invention, there is provided a haymaking machine of the kind set forth, wherein each tine group is freely pivotable relative to an arm about a corresponding first axis, and the arm is freely pivotable relative to a hub of the rake member about a second axis.

For a better understanding of the invention, and to show how the same may be carried into effect, reference will now be made, by way of example, to the accompanying drawings, in which.

Figure 1:
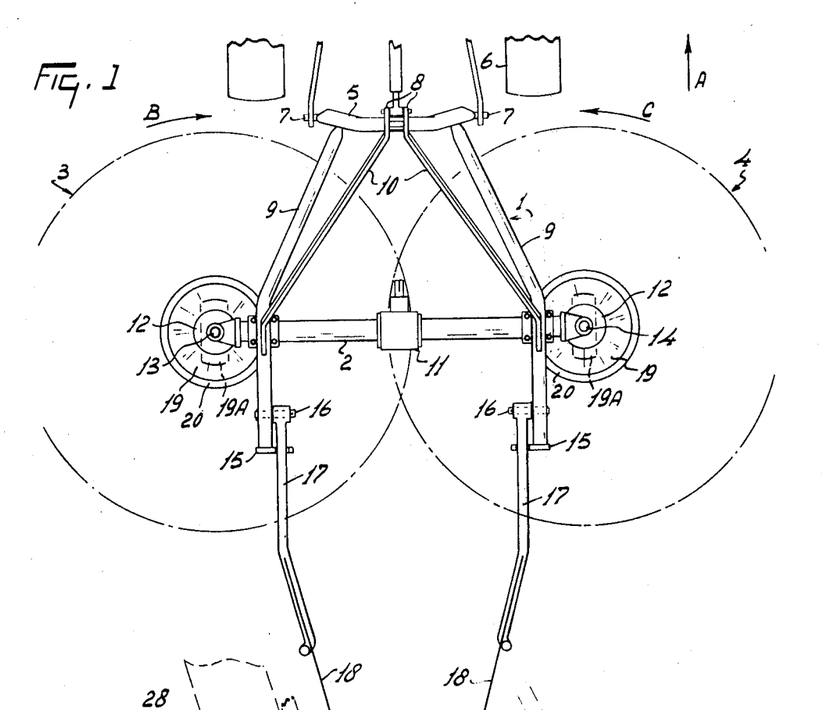
FIG. 1 is a plan view of a haymaking machine in accordance with the invention connected to the rear of an agricultural tractor.
Figure 2:
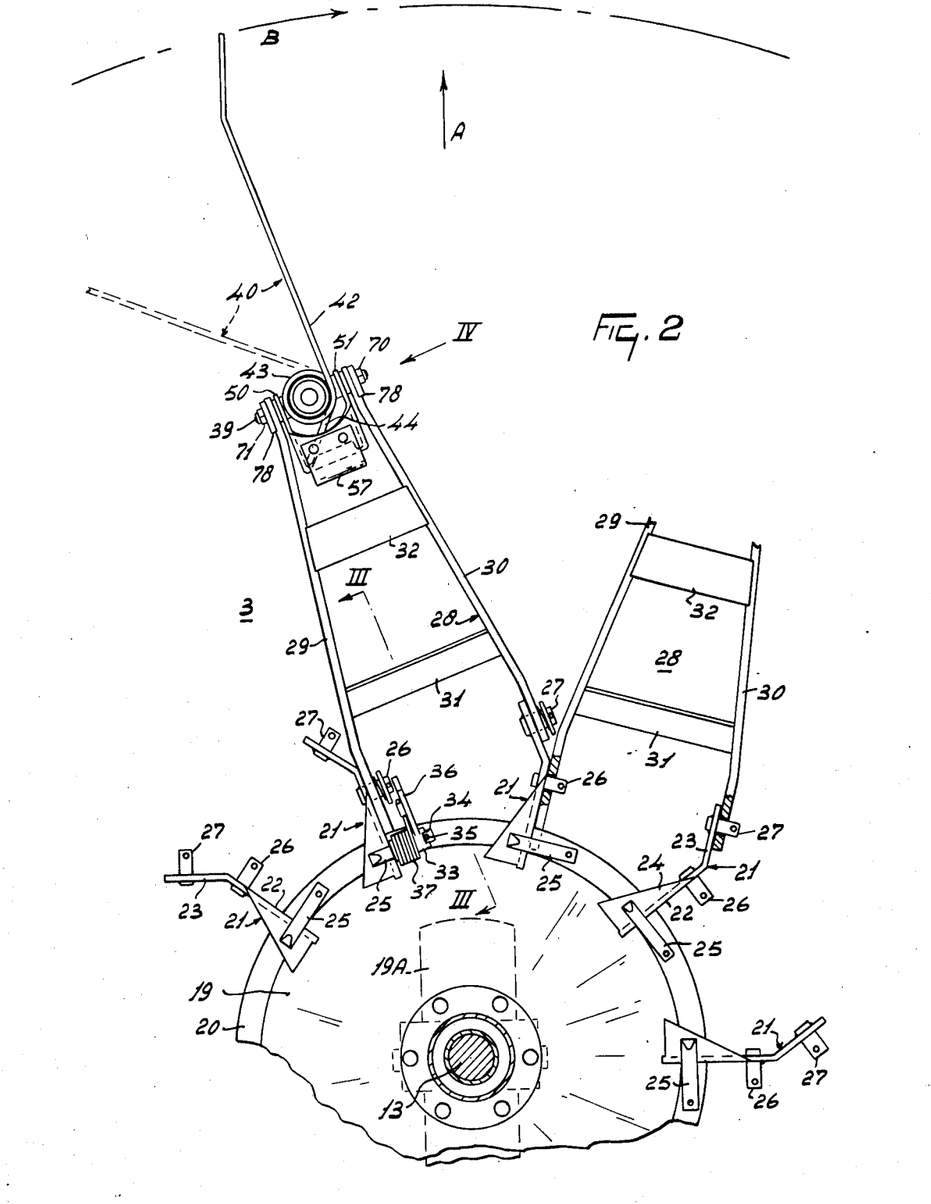
FIG. 2 is a part-sectional plan view, on an enlarged scale, illustrating parts of one of the two rake members of the machine of FIG. 1.

Referring to the drawings, the haymaking machine which is illustrated has a mobile frame that is generally indicated by the reference 1, said frame comprising a substantially horizontal main frame beam 2 that extends transverse, and normally substantially perpendicular, to the intended direction of operative travel of the machine which is indicated by an arrow A in FIGS. 1 and 2 of the drawings. Two rotary rake members 3 and 4 (which could also be considered as being rake heads or rake wheels) are mounted at the opposite ends of the main frame beam 2 in a manner which will be further described below but which is such that the paths which are traced by the tips of tines of the two rake members during rotation of those rake members in the opposite directions B and C that are indicated by arrows in FIG. 1 of the drawings overlap one another in a central region between the two rake members. This will be evident from FIG. 1 of the drawings in which the paths traced by the tips of the tines of the two rake members 3 and 4 are denoted by broken lines. The axes of rotation of the two rake members 3 and 4 are parallel and, during normal operation of the machine, they are both substantially, but not truly, vertically disposed in such a way that an upper region of each axis of rotation is a little further advanced with respect to the direction A than is a lower region thereof. The frame 1 includes a coupling member or trestle 5 that comprises a tubular beam of substantially inverted U-shaped configuration, the two limbs of the beam being downwardly divergent away from its base rather than parallel to each other. Substantially horizontally aligned coupling pins 7 are carried near the lowermost free ends of the limbs of the coupling member or trestle 5 and coupling means 8, which may be in the form of a pair of apertured lugs, are provided at the top and centre of the member or trestle 5. As will be evident from FIG. 1 of the drawings, the coupling pins 7 are arranged for co-operation with the free ends of the lower lifting links of the three-point lifting device or hitch of an agricultural tractor 6 or other operating vehicle and the upper coupling means 8 is arranged for pivotal connection to the free end of the upper lifting link of the same three-point lifting device or hitch. The upper lifting link of a three-point lifting device or hitch is, usually, adjustable in length and this adjustability can be employed to change the attitude of the machine to the ground surface as may be required.

Two tubular supporting beams 9 have their leading ends with respect to the direction A secured to the limbs of the coupling member or trestle 5 adjacent the lowermost ends of those limbs and thus close to the coupling pins 7, the supporting beams 9 extending rearwardly in divergent relationship from the coupling member or trestle 5 to locations at which they are bent to form substantially parallel portions which portions are fastened to opposite end regions of the main frame beam 2 close to gear boxes 12 that are located above the respective rake members 3 and 4. Two strip-shaped tie beams 10 rigidly interconnect an upper central region of the coupling member or trestle 5 and the tops of the two supporting beams 9 at the locations at which those beams are secured to the main frame beam 2. The leading ends of the two tie beams 10 may be integral with the upper coupling means 8 and it will be seen from FIG. 1 of the drawings that said tie beams 10 diverge rearwardly with respect to the direction A and are substantially symmetrical with respect to a vertical plane of substantial symmetry of the machine that extends parallel to said direction A. The main frame beam 2 is of hollow tubular construction and is provided midway along its transverse length with a gear box 11 that has a rotary input shaft whose splined or otherwise keyed end projects forwardly from the gear box in substantially the direction A. A telescopic transmission shaft having universal joints at its opposite ends may be employed in placing the rotary input shaft of the gear box 11 in driven connection with the power take-off shaft of the agricultural tractor 6 or other operating vehicle. The telescopic transmission shaft which has just been mentioned is of a construction which is known per se and is not illustrated in the drawings. The gear box 11 has two substantially horizontally aligned output driving shafts which extend axially into the hollow main frame beam 2 at opposite sides of the gear box 11. These two output driving shafts are in driving connection with the two rake members 3 and 4 by way of toothed pinions or other transmission members that are contained within the two gear boxes 12 that are fastened to the opposite ends of the main frame beam 2. The two rake members 3 and 4 resolve, during the use of the machine, around the axes of corresponding substantially vertical, or at least upright, shafts 13 and 14, those shafts being non-rotatably lodged in the corresponding gear boxes 12.

As previously mentioned, the two supporting beams 9 are sharply bent just in front of the main frame beam 2 with respect to the direction A to form parallel rear portions which, at least in plan view (FIG. 1), are substantially parallel to the direction A and substantially perpendicular to the frame beam 2. Each of the parallel rear portions which has just been mentioned extends rearwardly beyond the longitudinal axis of the main frame beam 2 (as seen in plan view, FIG. 1) through a distance which is equal to between substantially 50% and substantially 60% of the radius of the circle which is traced by the tips of the tines of one of the rake members 3 and 4 during rotation thereof. The hollow supporting beams 9 are of circular cross-section throughout their lengths and the strip-shaped tie beams 10 are of an oblong cross-section which is arranged so that the longer parallel sides of that cross-section are substantially vertically disposed.

The rearmost ends of the parallel rear portions of the two supporting beams 9 carry supporting plates or cradles 15 that are both contained in a substantially vertical plane which is substantially perpendicular to the direction A. The two plates or cradles 15 project inwardly towards one another from the parallel rear portions of the supporting beams 9 and their inner ends are formed with substantially U-shaped cradling recesses. Substantially horizontally aligned pivots 16 are carried by the parallel rear portions of the supporting beams 9 at locations that are a short distance in front of the plates or cradles 15 with respect to the direction A. Supporting arms 17 are pivotable about the two pivots 16 with the aid of sleeve bearings, said arms 17 being shown in FIG. 1 of the drawings in positions in which they extend rearwardly away from the pivots 16 with respect to the direction A with said arms 17 supportingly cradled in the recesses of the plates or cradles 15. This position, as illustrated in FIG. 1 of the drawings, is an operative raking or haymaking position in which the arms 17 extend substantially horizontally rearwards away from their pivots 16 to locations that are short distances behind the circles that are traced by the free ends or tips of the tines of the corresponding rake members 3 and 4 during rotation of those rake members (see FIG. 1 of the drawings). From the two locations which have just been mentioned, the arms 17 are bent downwardly and are then bent again to form further substantially horizontal portions which can make sliding contact with the ground surface during the operation of the machine. The extreme free ends of these two last-mentioned portions are bent upwardly. The portions beyond the two locations that are identified above are all bent towards one another by a few degrees to give the rearwardly convergent configuration that can be seen in FIG. 1 of the drawings and the downwardly bent portions carry a plurality of spring steel guide rods 18 that extend in substantially parallel but spaced relationship to form two guide surfaces for hay or other crop that converge rearwardly with respect to the direction A and that function to form hay or other crop displaced by the rake members 3 and 4 into a neat and compact swath or windrow during operation of the machine.

Figure 3:
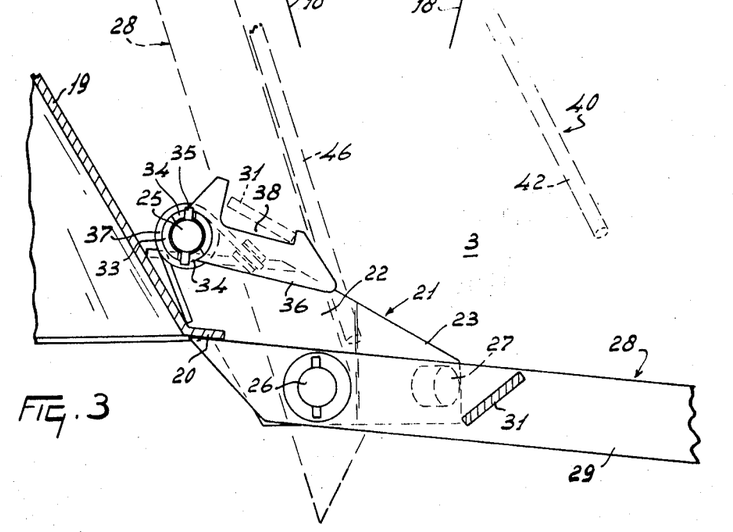
FIG. 3 is a section, to an enlarged scale, taken on the line III—III in FIG. 2.

Each of the rake members 3 and 4 has a central hub or housing 19 that is formed from sheet material into a frusto-conical shape. The top of each hub or housing 19 is disposed immediately beneath the corresponding gear box 12 and, beneath the base of each hub or housing 19, there is provided a corresponding ground wheel 19A that is indirectly connected to a lower region of the corresponding shaft 13 or 14 in such a way that the level of its substantially horizontal axle can be raised or lowered relative to the level of the remainder of the machine so as to support the machine for travel over the ground at a level appropriate to the prevailing operating or transport circumstances. The diameter of each hub or housing 19 at its lowermost end is not less than substantially twice the diameter thereof at its top and the upright longitudinal or central axes of the two hubs or housings substantially coincide with the longitudinal axes of the shafts 13 and 14 respectively. Since the two rake members 3 and 4 are substantially symmetrically identical, it is only necessary to describe one of them in detail and, accordingly, it should be borne in mind that the following description of the construction of the rake member 3 applies equally to that of the other rake member 4. The bottom of the hub or housing 19 of the rake member 3 has an outwardly directed rim or flange 20 (FIG. 3) which is inclined downwardly towards the ground at a few degrees to a plane perpendicular to the longitudinal axis of the shaft 13. Ten supports 21 (FIG. 2) are secured to the outer surface of the hub or housing 19 adjacent to the rim or flange 20 at regular 36° intervals around the axis of the shaft 13 (see FIG. 2). The supports 21 are formed from sheet material and at least a major portion 22 of each support is contained in a corresponding radial plane which also contains the longitudinal axis of the shaft 13. Each major radial portion 22 is, however, bent rearwardly with respect to the intended direction of rotation B at a location spaced radially outwardly from the rim or flange 20 to form an end portion 23, the integral bend or junction line between the portions 22 and 23 of each support 21 extending parallel to the shaft 13 and planes containing the two portions 22 and 23 being inclined to each other by an angle of substantially 36° at said bend or junction (see FIG. 2). Each support 21 is located partly above, and partly beneath, a plane which contains the outermost edge of the rim or flange 20 at the bottom of the hub or housing 19 (see FIG. 3). The single support 21 which is visible in FIG. 3 of the drawings has its region of maximum height located close to the hub or housing 19, its lowermost edge being substantially contained in a plane that is perpendicular to the shaft 13 while its uppermost edge is inclined outwardly and downwardly away from the hub or housing 19. However, as seen in FIG. 3 of the drawings, part of the upper edge of the support 21 is also contained in a plane that is perpendicular to the axis of the shaft 13 and this part actually coincides with a line about which a substantially triangular stiffening portion 24 (FIG. 2) is bent over. The radially inner end of each support portion 22 is welded to the hub or housing 19 and to the rim or flange 20 of that hub or housing and the radially inner edge of each substantially triangular stiffening portion 24 is welded to the outer surface of the hub or housing 19.

Each support portion 22 carries two parallel pivot pins 25 and 26 whose longitudinal axes are tangentially disposed with respect to circles centered upon the longitudinal axis of the shaft 13, said pins 25 and 26 thus preferably, but not essentially, being perpendicular to the shaft 13. It can be seen from FIG. 3 of the drawings that each pin 25 is located at a higher horizontal level than is each pin 26 and is disposed substantially above the rim or flange 20. Part of the length of each pin 25 is welded to the top of the corresponding stiffening portion 24 but a major part of the length thereof projects forwardly with respect to the direction B beyond the stiffening portion 24 and the underlying support portion 22 with which that stiffening portion is integral. The pins 26 are located radially outwardly from the rim or flange 20 at a level just below that rim or flange and also project forwardly from the corresponding support portions 22 with respect to the direction B. The end portion 23 of each support 21 carries a corresponding pivot pin 27 that is perpendicular to the plane of the end portion 23 concerned and that projects from said portion 23 generally in the direction B. The pins 26 and 27 project by equal distances from the corresponding support portions 22 and 23. The longitudinal axes of the pins 27 are inclined to the longitudinal axes of the corresponding pins 25 and 26 by the same angle as that by which the portions 22 and 23 are inclined to each other, i.e. 36°. As viewed lengthwise of the shaft 13 (FIG. 2), each pin 26 is fastened to the corresponding support 21 substantially midway between the fastening locations of the corresponding pins 25 and 27. A plane containing the longitudinal axes of the two pins 26 and 27 that correspond to each support 21 is substantially perpendicular to the axis of the shaft 13 and is located beneath the rim or flange 20 while the pin 25 is located above the plane and also above the rim or flange 20 (see FIG. 3). All ten of the supports 21 are, of course, of identical construction.

Arms 28 are connected to the supports 21 and carry groups of tines 40. Each arm 28 comprises two spaced strips or plates 29 and 30 that are of oblong cross-section and each support 21 has the strip or plate 29 of one arm 28 and the strip or plate 30 of the next neighbouring arm 28 coupled to it. The strips or plates 29 and 30 are arranged with the longer parallel sides of their cross-sections in substantially parallel relationship with the shaft 13 and it will be noted that the two strips or plates 29 and 30 of each arm 28 are substantially symmetrically identical to each other except that each strip or plate 29 is of greater length inwardly towards the shaft 13 than is each strip or plate 30. As viewed lengthwise of the shaft 13 (FIG. 2) with the machine in a working position, the two strips or plates 29 and 30 of each arm 28 converge outwardly but have parallel portions that co-operate with the supports 21. The portion of each strip or plate 29 that has just been mentioned is pivotably mounted on the pin 26 of one support whereas the corresponding portion of the strip or plate 30 of the same arm 28 is pivotably mounted on the pin 27 of the next neighbouring support 21 in the direction B. This arrangement is, of course, repeated in respect of all of the arms 28 and all of the supports 21. The pin 26 corresponding to one support 21 and the pin 27 corresponding to the next support 21 in the direction B are in alignment and thus the arms 28 are pivotable upwardly and downwardly about the axes defined by the aligned pins 26 and 27 relative to the hub or housing 19 of the rake member 3.

The supports 21 are so shaped that a plane of substantial symmetry that is located midway between the two strips or plates 29 and 30 of one of the arms 28 in parallel relationship with the shaft 13 contains a point on the outer edge of the rim or flange 20 that is in front, with respect to the direction B, of a point on the same rim or flange 20 that is contained in a further plane which also contains the longitudinal axis of the shaft 13 and a point midway between the outermost ends of the two strips or plates 29 and 30 of the arm 28 under consideration. Each strip or plate 30 terminates at its inner end close to the pivotal connection thereof to the corresponding pin 27 whereas the inner end of each strip or plate 29 is located radially inwardly beyond the corresponding pin 26 at a position beneath the rim or flange 20. This condition is shown in full lines in FIG. 3 of the drawings and corresponds to a working position of the machine. It will be noted from FIG. 3 of the drawings that the inner end of each arm 29 has its lower edge bevelled to form a wedge-shaped portion whose tip, in the working position which has just been mentioned, is disposed substantially constantly beneath the rim or flange 20 alongside the junction thereof with the hub or housing 19. The upper surface of the wedge-shaped portion which has just been mentioned bears against the lower surface of the rim or flange 20 which latter affords a stop. The strips or plates 29 and 30 of each arm 28 are rigidly interconnected by two spaced stiffening ribs 31 and 32. Each rib 31 is located approximately one-third of the length of the corresponding arm 28 away from the innermost ends of the strips or plates 29 and 30 whereas each rib 32 is located a similar distance away from the outermost ends of the same strips or pates 29 and 30. The ribs 31 and 32 are quite broad in width and their opposite ends are rigidly secured to the strips or plates 29 and 30 of the corresponding arm 28 so that said ribs 31 and 32 materially contribute to the shear resistance of each arm 28. When the machine is in a working position, the ribs 32 extend substantially perpendicular to the axis of the shaft 13 whereas the general plane of each rib 31 is inclined by an angle of substantially 40° to a plane that is perpendicular to said shaft 13, the inner edge of each rib 31 being located at a lower horizontal level than the outer edge thereof (see FIGS. 2 and 3).

Each pin 25 is surrounded by a sleeve 33 whose end that is furthest remote from the stiffening portion 24 of the corresponding support 21 is formed with two diametrically opposite arcuately curved recesses 34 (FIG. 3). A transverse pin 35 entered diametrically through the pivot pin 25 has its opposite ends located in the recesses 34 whose angular extents are such that the sleeve 33 can turn relative to the pivot pin 25 through an angle which may conveniently be substantially 30°. A plane 36 forming part of a latch is rigidly secured to the sleeve 33 near the recesses 34, said plate 36 extending perpendicular to the common axis of the sleeve 33 and pin 25 in a direction away from the hub or housing 19 (see FIG. 3). A coil spring 37 is wound around the sleeve 33 alongside the plate 36 and has one of its ends connected to that plate, the opposite end of the spring bearing against the hub or housing 19 just above the rim or flange 20 (see FIG. 3). The arrangement is such that the spring 37 tends to turn the plate 36 and sleeve 33 in an anticlockwise direction about the pin 25 as seen in FIG. 3 of the drawings but will be remembered that the recesses 34 and transverse pin 35 co-operate to limit the turning movement of the sleeve 33 and plate 36 that is possible. The upper edge of the plate 36 is formed with a recess 38 which is shaped so that it can receive the rib 31 of one of the arms 28.

The outermost ends of the strips or plates 29 and 30 of each arm 28 are spaced apart from one another and are formed with aligned holes or slots through which a corresponding shaft 39 (FIGS. 2, 4, 5 and 6) is entered. A corresponding group of two of the tines 40 is freely pivotable about the axis of the shaft 39 relative to the arm 28. The longitudinal axis of the shaft 39 is perpendicular to a plane of substantial symmetry of the arm 28 that is located midway between its strips or plates 29 and 30, said shaft 39 also preferably extending substantially perpendicular to the shaft 13. However, as in the cases of the pins 26 and 27, it is not essential that the longitudinal axis of each shaft 39 should be strictly perpendiciular to the longitudinal axis of the shaft 13.

A sleeve-like tine support 41 is freely pivotable about the axis of the shaft 39, the longitudinal axis of the support 41 and the longitudinal axis of the shaft 39 being perpendicularly disposed in intersecting relationship. The group of two tines 40 comprises an upper tine 42 whose inner end merges integrally into a helical coil 43 that is wound around the tine support 41 above the shaft 39, the opposite end of the coil 43 from the upper tine 42 merging integrally into a U-shaped connecting bracket 44 that projects from the support 41 in an opposite direction to the upper tine 42 and that will function as a lever. The other and lower limb of the bracket 44 merges integrally into one end of a helical coil 45 that is wound around the support 41 beneath the shaft 39, the opposite end of said coil 45 merging integrally into a lower tine 46 which is the second tine of the group of two tines 40. The whole group 40 comprising the upper and lower tines 42 and 46, the coils 43 and 45 and the connecting bracket 44 is formed integrally from a single length of spring steel rod. The bracket 44 is contained in a plane that is parallel to the longitudinal axis 47 (FIGS. 4 and 5) of the tine support 41, said plane being inclined by an angle of substantially 130° to a plane which contains the longitudinal axes of the corresponding upper and lower tines 42 and 46 (see FIG. 6). A pivotable clamping member which is generally indicated by the reference 48 embraces opposite sides of the tine support 41 between the two strips or plates 29 and 30 of the arm 28, said pivotable clamping member 48 being mounted on the shaft 39 and preferably, but not essentially, being formed as an aluminium or aluminium alloy casting. The pivotable clamping member 48 serves as an adjusting mechanism by which the tine group 40 can be set in a required position.

Figure 6:
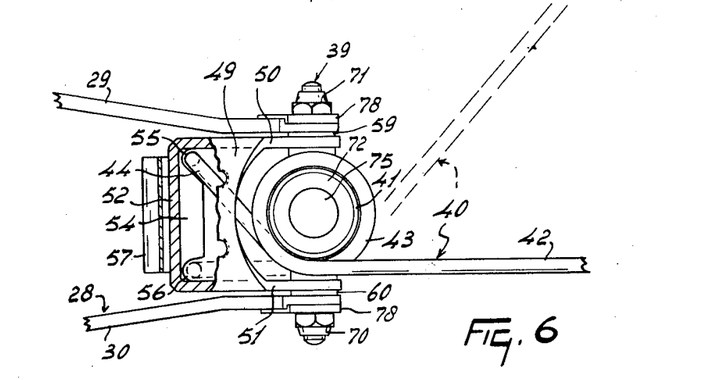
FIG. 6 is a plan view as seen in the direction indicated by an arrow VI in FIG. 4 with the omission of some parts for the sake of clarity.

The clamping member 48 has an upper wall 49 which is parallel to the shaft 39, said upper wall 49 having an arcuately curved edge that is directed towards the support 41 but in spaced relationship therewith (see FIG. 6). The upper wall 49 joins opposite side walls 50 and 51 that extend downwardly away from the upper wall 49 at opposite sides of the tine support 41 in perpendicular relationship with the longitudinal axis of the shaft 39. A rear wall 52 interconnects the edges of the side walls 50 and 51 that are remote from the shaft 39. The rear wall 52 is directly connected to the upper wall 49 by way of an inclined portion 53 (FIG. 4) and the lowermost edge of said rear wall 52 has a rim 54 which is bent towards the shaft 39. The rim 54 is formed with two notches 55 and 56 (FIG. 6) which notches are located close to the junctions of said rim with the respective side walls 50 and 51. It can be seen from FIG. 6 of the drawings that the shapes of the notches 55 and 56 are such that the connecting bracket 44 can be entered in the notch 55 to retain the tine group 40 in the position shown in full lines in FIG. 6 or can be entered in the notch 56 to retain the tine group 40 in the alternative position that is shown in broken lines in FIG. 6. When the bracket 44 is in one or the other of the notches 55 and 56, it is enclosed by the rim 54 and by the side walls 50 and 51.

Figure 4:
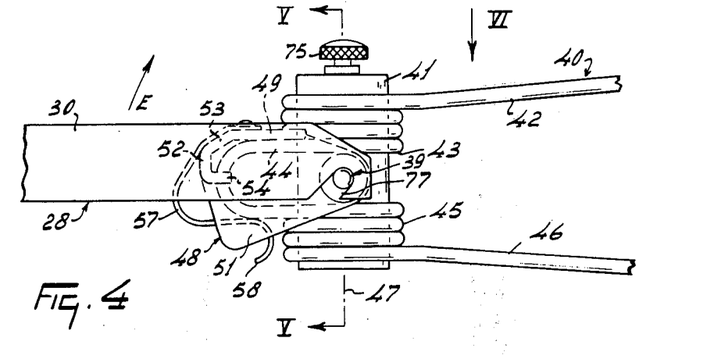
FIG. 4 is a side elevation, on an enlarged scale, as seen in the direction indicated by an arrow IV in FIG. 2.

The pivotable clamping member 48 is so shaped that, as can be seen in FIG. 4 of the drawings, the upper half of the bracket 44 is in the portion of said member 48 that is located beneath its upper wall 49 and against the edge of the rim 54, the lower half of said bracket 44 being located beneath the rim 54. The side wall 51 extends to a lower level than does the opposite side wall 50 and the top surface of the upper wall 49 has one end of a spring steel clamping plate 57 fastened to it. The spring steel clamping plate 57 is bent away from its fastened end to follow the contour of the inclined portion 53 after which it is bent towards the helical coil 45 and is then bent back away from that helical coil to form a handle 58. It will be noted that the spring steel clamping plate 57 is bent around the rim 54, although being in spaced relationship with that rim, and that, near the handle 58, it bears against the lower limb of the bracket 44 in a direction which tends to urge that bracket upwardly as seen in FIG. 4 of the drawings. A lower portion of the side wall 51 affords shielding protection for the spring steel clamping plate 57 during the operation of the machine. The strength and initial configuration of the spring steel clamping plate 57 is such that it tends to maintain the upper limb of the bracket 44 in contact with the lower surface of the upper wall 49 of the pivotable clamping member 48. The side walls 50 and 51 are provided around the shaft 39 and alongside the strips or plates 29 and 30 with bearings 59 and 60 of different effective diameters which bushes enable the clamping member 48 to pivot freely about the shaft 39. The bearing 59 is located between the strip or plate 29 and the tine support 41 and the bearing 60 is located between the strip or plate 30 and the opposite side of the tine support 41.

The sleeve-like tine support 41 is of hollow substantially cylindrical formation and, substantially half way along its axial length, it is formed with two inwardly directed and diametrically opposite bearings 61 and 62 respectively. The bushes 61 and 62 are open at their opposite ends and each of them is formed with an internal screw-thread (not shown). It will be seen from FIG. 5 of the drawings that the shaft 39 is of stepped construction throughout its length. The end thereof that co-operates with the strip or plate 30 comprises a stub 63 which is followed by a thicker portion 64 that co-operates with the bearing bush 60 and subsequently by an externally screw-threaded portion 65 of even greater diameter that co-operates with the internal screw-thread of the bush 62. The screw-threaded portion 65 is connected to a joining portion 66 that is of the same diameter as the portion 64 but greater length and this joining portion 66 is, in turn, followed by an externally screw-threaded portion 67 that is similar to the portion 65 and that co-operates with the internal screw-thread of the bush 61. Immediately beyond the portion 67, there is a portion 68 of the greatest diameter of any of the portions of the shaft 39 which portion co-operates with the bearing bush 59. A stub 69 is located immediately beyond the portion 68 of greatest diameter and this stub 69 co-operates with the strip or plate 29. The stubs 63 and 69 are of substantially the same diameter and, beyond each of them, there is a screw-threaded end portion to receive a nut 70 or 71 respectively. The nuts 70 and 71 preferably incorporate inserts formed from nylon or the like, the inserts being designed to prevent vibration from working the nuts 70 and 71 loose once they have been tightened into their intended positions. The bearing bushes 59 and 60 and thus the clamping member 48 are freely pivotable on the shaft 39. The co-operating screw-threads on the bush 61 and shaft portion 67 and on the bush 62 and shaft portion 65 allow the tine support 41 to turn about the shaft 39 by co-operation of the screw-threads.

The lower end of the tine support 41 is open but its uppermost end is closed by a cover 72. The center of the cover 72 is formed with a hole and an internally screw-threaded sleeve 73 is mounted in said hole in such a way that the longitudinal axis of the sleeve 73 coincides with the longitudinal axis 47 of the tine support 41 itself. A set screw 74 is entered through the screw-threaded sleeve 73 and has a knurled knob 75 at its external end. The portion of the set screw 74 that is located inside the tine support 41 beneath the cover 72 has a cylindrical mass or body 76 rigidly secured to it, said body 76 fitting inside the support 41, above the shaft 39, with sufficient clearance to ensure that it can be rotated without difficulty inside said support 41. It is preferred that the body 76 should have an axial length in a direction parallel to the longitudinal axis of the set screw 74 that is equal to substantially half the length of that part of the tine support 41 that is located above the bushes 61 and 62 as seen in FIG. 5 of the drawings.

The upper and lower tines 42 and 46 of each group 40 are located one above the other during operation of the machine, as seen in plan view (FIG. 2), and it will be noted that outer end regions of those tines are bent forwardly with respect to the direction B so as to extend at angles of substantially 120° to the remaining inner and greater portions of said tines. The machine which has been described can be employed as a tedder for spreading hay or other crop more or less at random over the ground surface in which case the tine groups 40 are placed in the approximately radial positions that are indicated by full lines in FIGS. 2 and 6 of the drawings and the machine is employed with the spring steel guide rods 18 and their supporting arms 17 tilted upwardly and forwardly about the pivots 16 to inoperative positions in which they will not be contacted by the hay or other crop that is displaced by the tines 42 and 46. The machine can also be used to form hay or other crop into swaths or windrows that extend longitudinally parallel to the direction A and, when this form of working is required, the tine groups 40 are placed in the trailing (with respect to the directions B and C) positions thereof that are shown in broken lines in FIGS. 2 and 6 of the drawings and the spring steel guide rods 18 and their supporting arms 17 are placed in the operative positions thereof that are shown in FIG. 1 of the drawings.

In the use of the haymaking machine which has been described, its coupling member or trestle 5 is connected to the three-point lifting device or hitch of the agricultural tractor 6 or some other operating vehicle in the manner briefly described above and the rotary input shaft of the gear box 11 is placed in driven connection with the power take-off shaft of the same tractor 6 or other operating vehicle by way of the intermediate telescopic transmission shaft having universal joints at its opposite ends (not shown) that has been mentioned above. The transmission members within the gear box 11, the hollow main frame beam 2 and the gear boxes 12 cause the rake members 3 and 4 to rotate in the opposite directions B and C and this rotation generates centrifugal forces that are exerted upon the arms 28 and the tine groups 40 which they carry. The arms 28 thus turn about the corresponding aligned pivot pins 26 and 27 and adopt positions which are as near as possible to radial, the arms and tine groups 40 actually being inclined downwardly to a small extent as a result of their weights. The machine is so constructed and arranged that the inner wedge-shaped portions of the strips or plates 29 bear with light pressure against the lower surface of the rim or flange 20 (see FIG. 3). Each arm 28 is, however, freely pivotable about the second axis defined by the corresponding pair of pins 26 and 27 but movement in a downward direction is restricted by co-operation of the inner ends of the strips or plates 29 with the stop that is afforded by the rim or flange 20. Each tine group 40 is, however, also freely pivotable relative to the corresponding arm 28 about the first axis of the shaft 39, it being remembered that the screw-threads on the parts 61, 62, 65 and 67 co-operate freely to allow such pivoting. The shaft 39 is entered through inclined slots 77 formed in the outer ends of the strips or plates 29 and 30 and it will be seen from FIG. 4 of the drawings that said slots 77 open onto the lowermost edges of said strips or plates and are inclined upwardly therefrom in directions away from the pivots 26 and 27. When centrifugal forces act upon each shaft 39 and the parts which it carries, those forces tend to move said shafts 39 upwardly along the slots 77 to the upper ends thereof so that they adopt positions corresponding to the position illustrated in FIG. 4. In order that the shafts 39 shall not drop downwardly out of the slots 77 when the rake members 3 and 4 are not rotating, each end of each shaft 39 is provided with a corresponding safety plate 78 that is omitted in FIG. 4 of the drawings for the sake of clarity but that can be seen in both FIGS. 5 and 6 thereof. Upper and lower edges of the safety plates 78 have bent rims which engage above and beneath the upper and lower edges of the strips or plates 29 and 30.

Figure 5:
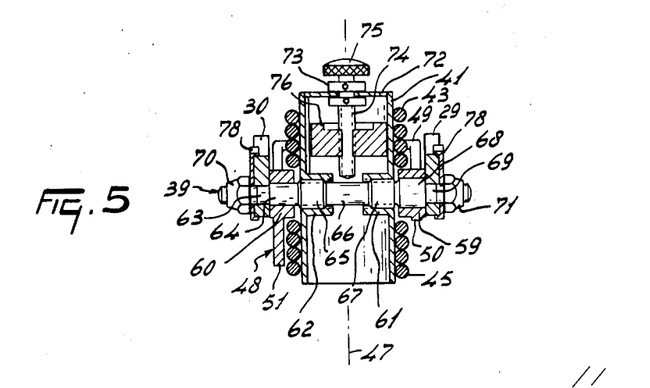
FIG. 5 is a section taken on the line V—V in FIG. 4.

The forces that are exerted by the tine groups 40 on the arms 28 during the operation of the machine are borne by the co-operating screw-threads of the parts 61, 62, 65 and 67 (FIG. 5). These co-operating parts exhibit quite large contacting surfaces so that the load per unit area on such surfaces that occurs during operation is never too great. Angular displacement of one of the tine supports 41 relative to the corresponding arm 28 about the axis of the shaft 39 involves a small displacement of the support 41 axially along the shaft 39 because of the co-operation therebetween by way of screw-threaded bearings. In order that this displacement may be accommodated, small gaps are left between the outer surface of each tine support 41 and the facing ends of the bearing bushes 59 and 60 (see FIG. 5). The interconnection by way of screw-threaded bearings tends to reduce bearing play to a minimum even after long periods of use. The resilient construction of each clamping plate 57 causes each clamping member 48 to tend to remain in contact with the connecting bracket 44 of each tine group 40 and thus each clamping member 48 is freely pivotable about the axis of the corresponding shaft 39 with its tine group 40. The tines 42 and 46 can thus readily match undulations in the surface of the ground over which the machine travels during its use and can deflect upon meeting most obstacles.

The tine groups 40 and their clamping members 48 are constructed and dimensioned in such a way that the center or point of gravity of each such assembly will, during operation, be located radially outwardly beyond the corresponding axis 47 (FIGS. 4 and 5) at a level slightly above that of a plane that contains the longitudinal axis of the corresponding shaft 39 while being perpendicular to the axis 47. The tine 42 and 46 will thus always tend to be inclined downwardly towards the ground surface during rotation of the rake members 3 and 4 at an operational speed and will tend to return to such positions after a temporary deflection. The free pivotability of the tine groups 40 relative to the arms 28 and of the arms 28 relative to the supports 21 has the result that the arms 28 will substantially constantly occupy positions such as the position that is shown in full lines in FIG. 3 of the drawings in respect of one of them. Only when very strong resistance to movement of the tine groups 40 is exerted upon the outer ends of the tines will the arms 28 be turned upwardly about the axes of the corresponding pins 26 and 27. As soon as the resistance to progress of the tine groups 40 returns to normal, the arms 28 will immediately return to the position shown in full lines in FIG. 3 under the action of centrifugal forces and gravity.

As briefly discussed above, each tine group 40 may be set in either chosen one of two different operating positions although it will be noted that it is possible to provide more than two such possible operating positions if desired. The full line positions that are shown in FIGS. 2 and 6 of the drawings are suitable for spreading operations such as tedding while the broken line positions that are shown in the same Figures are suitable for operations in which hay or other crop is raked together to form a swath or windrow or other crop accumulation. The latter broken line position is markedly trailing with respect to the corresponding direction B or C and is behind the full line position with respect to the corresponding direction B or C. When it is desired to re-adjust the tine groups 40 from a position suitable for one mode of operation to a position suitable for the other mode thereof, the relative positions of the tine groups 40 and their clamping members 48 have to be changed. The handle 58 of each successive clamping plate 57 is grasped and is moved to allow the corresponding connecting bracket 44 to become disengaged from the clamping member 48 concerned. Each clamping member 48 is freely pivotable about its corresponding shaft 39 relative to the tine support 41 concerned and thus can be turned upwardly about the shaft 39 in the direction indicated by an arrow E in FIG. 4 of the drawings. Thus, if the bracket 44 should be initially located in the notch 55 (FIG. 6), it will move downwardly out of that notch after which the whole tine group 40 can be turned angularly about the external surface of the tine support 41 to bring the connecting bracket 44 thereof into line with the alternative notch 56. The clamping member 48 is then turned back about the shaft 39 in a direction opposite to the direction E thus entering the bracket 44 retainingly into the notch 56. The handle 58 of the spring steel clamping plate 57 is then released thus allowing that plate to return to the retaining position thereof that can be seen best in FIG. 4 of the drawings. The tine groups 40 will then occupy the broken line positions thereof that are shown in FIGS. 2 and 6 of the drawings but they can be returned to the full line positions that are illustrated in the same Figures by reversing the procedure which has just been described.

The dispositions of the tines 42 and 46 relative to their arms 28 and relative to the ground surface can be changed to provide an optimum effect under varying operational conditions by changing the position of the center of gravity of each assembly comprising one tine group, the corresponding support 41 and the corresponding clamping member 48. This adjustment is effected merely by turning each knurled knob 75 in an appropriate direction to raise or lower the corresponding cylindrical body 76 in the interior of the tine support 41 concerned. The position of the center or point of gravity of each such assembly is thus raised or lowered. When the machine is to be used for a raking operation with its tine groups 40 set in the broken line positions thereof that are shown in FIGS. 2 and 6 of the drawings, the frame 1 is usually set at as low a level above the ground surface as possible employing the upwardly and downwardly adjustable ground wheels 19A for that purpose. Each cylindrical body 76 is then conveniently brought to a position as close as possible to the corresponding shaft 39 thus bringing the center or point of gravity of the corresponding assembly to as low a position as possible. When centrifugal forces act upon said assemblies during the use of the machine, the tines 40 and 46 will tend to occupy more nearly horizontal positions than would be the case if the bodies 76 were set at higher levels in the interiors of the tine supports 41. Conversely, when the frame 1 of the machine is set at a higher level above the ground surface for tedding or other crop spreading purposes, it is usually desirable that the bodies 76 should be raised in the tine supports 41 to ensure that the tines of the groups 40 will be significantly downwardly inclined towards the ground surface during operation of the machine.

The machine can be brought to an inoperative transport position in which its width is greatly reduced as compared with a working position thereof and this is effected by turning each arm 28 and the parts which it carries upwardly about the corresponding pivot pins 26 and 27 to reach the position which is illustrated in broken lines for one such assembly in FIG. 3 of the drawings. As the arms 28 turn upwardly, the tine groups 40 will turn downwardly about the shafts 39 until at least the lower tines 46 hang against the arms 28 as shown in broken lines in FIG. 3. When each arm 28 is turned upwardly nearly as far as it will go, its rib 31 first meets an outer bevelled edge of the corresponding latch plate 36 and causes that latch plate to turn downwardly about the corresponding pin 25 against the action of the consequently tightened spring 37. The bevelled edge of the latch plate 36 is in alignment with the rib 31 because the co-operating recesses 34 and transverse pin 35 prevent the spring 37 from normally turning the latch plate 36 too far upwardly about the pivot pin 25. The angular magnitude of each recess 34 is sufficient to enable the rib 31 to snap over the upper edge of the deflected plate 36 and into the corresponding latching recess 38. Each arm 28 and the parts which it carries is thus safely latched in the upwardly deflected inoperative transport position. When a return to an operating position is required, each latch plate 36 has to be turned manually through a few degrees about the corresponding pin 25 in a clockwise direction as seen in FIG. 3 of the drawings to release the rib 31 from the latching recess 38 after which the arm 28 can be turned about the common axis of the corresponding pins 26 and 27 nd the latch plate 36 be disengaged to tilt back upwardly under the action of the spring 37. The operating position of each arm 28 is illustrated in respect of one of those arms in full lines in FIG. 3 of the drawings in which position the inner wedge-shaped end portion of the strip or plate 29 engages beneath the stop afforded by the rim or flange 20.

When the guide rods 18 and their supporting arms 17 are in use, lower portions of the guide rods 17 slide over the ground surface and cause said guide rods 18 to turn upwardly and downwardly about the pivots 16 to match undulations in that surface. The plates or cradles 15 define lower limits to the free downward turnability of the arms 17 and sustain said arms from beneath when the machine is lifted clear of the ground by the three-point lifting device or hitch of the agricultural tractor 6 or other operating vehicle to which the machine is operatively connected. When the machine is to undertake a tedding or other crop spreading operation or is to be inoperatively transported under circumstances in which it is inconvenient that the arms 17 and guide rods 18 should project to an appreciable extent from the rear of the machine, the arms 17 and the rods 18 which they carry are turned upwardly about the pivots 16 until they lie in more or less inverted positions on top of the tie beams 10 of the frame 1.

Although various features of the haymaking machine that has been described and/or that are illustrated in the accompanying drawings will be set forth in the following claims as inventive features, it is emphasised that the invention is not necessarily limited to those features and that it includes within its scope each of the parts of the haymaking machine that has been described and/or that has been illustrated in the accompanying drawings both individually and in various combinations.

We claim:

1. A haymaking machine comprising a frame and at least one rake member supported on the frame and rotatable about an upwardly extending axis, said member comprising a substantially central hub and a plurality of arms extending outwardly from said hub during normal raking operation, a tine group connected to the outer arm by a pivot connection and being freely pivotable about a first axis defined by that connection, said arms being connected to said hub by corresponding pivot means and each arm being freely movable about a second axis defined by said pivot means, said tine group having a center of gravity and adjustable weight means associated with that group, the location of said weight means being adjustable to change the location of said center of gravity and vary the working position of the tine group about said first axis.

2. A haymaking machine according to claim 1, wherein the first and second pivotal axes are both non-parallel to said upwardly extending axis of rotation of said rake member.

3. A haymaking machine according to claim 1, wherein the first and second pivotal axes are substantially parallel to each other.

4. A haymaking machine according to claim 1, wherein the first and second pivotal axes extend substantially perpendicular to said axis of rotation.

5. A haymaking machine according to claim 1, wherein a stop on said rake member is positioned to limit the pivotal movement of said arm relative to said hub about the second axis.

6. A haymaking machine according to claim 5, wherein said second axis is located adjacent said hub and a portion of said arm is normally in contact with said stop during the rotational operation of the machine.

7. A haymaking machine according to claim 1, wherein said arm is substantially symmetrical in configuration when viewed in a direction parallel to the axis of rotation of said rake member and a plane of said symmetry is spaced from the axis of rotation of said rake member during the rotational operation of the machine, said hub having a plurality of substantially identical outwardly projecting supports, each of said supports interconnecting an immediately neighboring pair of said arms.

8. A haymaking machine according to claim 7, wherein each support has two spaced-apart pivot pins and the longitudinal axes of said pins are tangential in a circle centered on said upwardly extending axis.

9. A haymaking machine according to claim 1, wherein said hub mounts at least one latching mechanism that is connectable to at least one arm to retain same in an inoperative transport position.

10. A haymaking machine according to claim 9, wherein said latching mechanism comprises a latch plate that is turnable between two limit positions, resilient means being positioned to urge said latch plate into one of said limit positions and said latching mechanism being positioned to engage a rib of said arm and retain the arm in transport position.

11. A haymaking machine according to claim 1, wherein each tine group is coupled with a corresponding adjusting mechanism and the latter is pivotable relative to its corresponding arm, each adjusting mechanism being pivotable relative to said arm to change the operational setting of the corresponding tine group.

12. A haymaking machine comprising a frame and at least one rake member supported on the frame and rotatable about an upwardly extending axis, said member comprising a substantially central hub and a plurality of arms extending outwardly from said hub during normal raking operation, a tine group on a support connected adjacent the outer end of each arm by a pivot connection and being freely pivotable about an axis defined by said connection, an adjusting mechanism connected to said tine group and the latter being movable with respect to said support and retainable by said mechanism in different working positions relative to said arm, said mechanism being pivotable about said pivot connection.

13. A haymaking machine as claimed in claim 12, wherein said mechanism comprises a clamping member mounted on said pivot connection.

14. A haymaking machine as claimed in claim 12, wherein said tine group comprises a helical coil that encircles said support.

15. A haymaking machine as claimed in claim 14, wherein said support has a longitudinal axis that is substantially vertical and said pivot connection comprises a shaft that is substantially horizontal and extends through said support.

16. A haymaking machine according to claim 12, wherein said adjusting mechanism and tine group are both freely pivotable relative to said arm about said pivot connection.

17. A haymaking machine according to claim 12, wherein said adjusting mechanism has means that fix same in position relative to said tine group.

18. A haymaking machine comprising a frame and at least one rake member supported on the frame and rotatable about an upwardly extending axis, said rake member having a central portion and a plurality of tine groups pivotally connected to respective arms that extend outwardly from connections to said central portion, each tine group being pivotable relative to its respective arm about a corresponding axis, each tine group comprising tines and a helical coil interconnected to its respective arm by bracket-like lever means, said lever means being displaceable relative to said arm and said tine group being movable to different positions, retaining means on said arm being positioned to engage said lever means and secure the tines in any chosen one of two different positions.

19. A haymaking machine according to claim 18, wherein said tines, helical coil and corresponding lever are formed from a single length of spring steel rod.

20. A haymaking machine according to claim 18, wherein said coil is mounted on a support and a displaceable mass on said support is adjustable in position relative to that tine group to change the location of its center of gravity, said mass being retainable in any chosen setting relative to said support.

21. A haymaking machine according to claim 20, wherein said support has a hollow right circular cylindrical configuration and is externally surrounded by said helical coil.

22. A haymaking machine according to claim 21, wherein said mass is displaceable in a direction substantially perpendicular to said corresponding axis.

23. A haymaking machine according to claim 18, wherein said corresponding axis includes at least one screw-threaded shaft.

24. A haymaking machine comprising a frame and at least one rake member supported on the frame and rotatable about an upwardly extending axis, said rake member having a central portion and a plurality of tine groups pivotally connected to respective arms that extend outwardly from connections to said central portion, each tine group being pivotable relative to its respective arm about a corresponding axis, each tine group comprising at least one tine mounted on a support and said support being connected to said arm by threaded shaft means, said shaft means extending through at least one threaded bearing in the support and said support with tine being freely pivotable on said threaded shaft means during operation.

25. A haymaking machine as claimed in claim 24, wherein said shaft means includes a substantially horizontal shaft that has threaded portions engaging a plurality of threaded bearings in said support.

26. A haymaking machine as claimed in claim 25, wherein a clamping member is mounted on said shaft and said support is positioned between opposite sides of said clamping member, said tine being engaged and held in position by said clamping member.

27. A haymaking machine according to claim 24, wherein there are two rake members on said machine and driving means is connected to rotate said members in opposite directions during operation.

28. A haymaking machine according to claim 27, wherein a guide member for the formation of crop into a swath/windrow is pivoted to said machine and extends to the rear of the rake members with respect to the normal direction of travel, said guide members being tiltable upwardly to an inoperative position.

* * * * *